Oct. 20, 1959  J. VINŠ  2,909,396
PLAIN BEARING
Filed June 10, 1957  2 Sheets-Sheet 1

INVENTOR.
Jindřich Vinš
BY Richard [signature]
ag't

Oct. 20, 1959

J. VINŠ

2,909,396

PLAIN BEARING

Filed June 10, 1957

INVENTOR.
Jindřich Vinš
BY
Richard Ernst
Ag't

United States Patent Office 2,909,396
Patented Oct. 20, 1959

2,909,396

PLAIN BEARING

Jindřich Vinš, Prague, Czechoslovakia

Application June 10, 1957, Serial No. 664,643

2 Claims. (Cl. 308—121)

The present invention relates to a plain bearing and more particularly to a plain bearing with hydrodynamic lubrication for combined radial and axial or thrust loads.

Plain bearings receiving both the radial and axial or thrust loads of a shaft are usually designed with the respective sliding or bearing surfaces arranged independently from one another, and with the bearing surface receiving the radial load usually having a larger diameter than the bearing surface receiving the axial load. Plain bearings of this type with hydrodynamic lubrication in practice always have a lower carrying capacity than that corresponding theoretically to a bearing of infinite length.

This considerable disadvantage of the usual bearings is due to a leakage of lubrication oil from the edges of the sliding or bearing surface receiving the radial load, with the unfavorable influence of the leakage being increased as the length of the bearing is decreased. An increase of the carrying capacity of the bearing by choosing a larger length thereof, is not desirable, as it leads to an excessive increase of frictional losses.

The above mentioned disadvantage or deficiency of the usual plain bearings with hydrodynamic lubrication, in particular for combined radial and axial loads, is removed by the present invention.

According to the invention one or two bearing surfaces receiving the axial load and the bearing surface of the bearing bush receiving the radial load are arranged around the profile of the shaft collar, with the bearing surface receiving the radial load being provided on the largest radius of the respective contour.

A substantial improvement is achieved according to the invention by a combination of the bearing surfaces both for the radial and axial loads into such an operational unit, in which the leakage of lubricating oil from the edges of the bearing surface receiving the radial load is essentially reduced. The invention relates not only to the principle itself, but also to a suitable arrangement by means of which the above mentioned advantages may be achieved. The arrangement of the plain bearing according to the invention results in a substantially higher carrying capacity of the bearing than that of a bearing of the usual design and having the same length.

The accompanying drawings show, by way of example, two designs of bearings according to the present invention. In the drawings.

Figure 1:
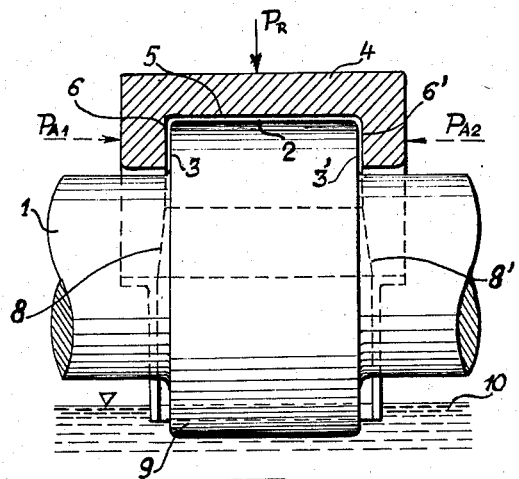
Fig. 1 is an elevational view, partly in section, of a horizontal bearing.
Figure 2:
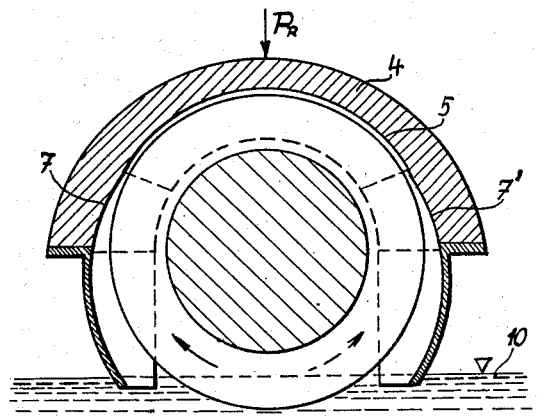
Fig. 2 is a cross-sectional view of the horizontal bearing of Fig. 1.

The bearing for a horizontal shaft as shown in Figs. 1 and 2 is suitable for receiving a vertical load $P_R$.

A collar 9 is provided on a shaft 1, the circumferential surface 2 of the collar representing the radial bearing surface, whereas the two annular, radially directed surfaces 3, 3' form the axial bearing surfaces of the shaft. The corresponding bearing bush 4 has the shape of a semi-cylinder with a recess corresponding to the shape of the shaft 1 with the collar 9. The recess for the collar presents the bearing surfaces of the bush 4, namely a circumferential surface 5 for the radial load and lateral surfaces 6, 6' for the axial load. All these bearing surfaces of the bush 4 are provided, at both ends, with inclined guiding edges disposed at increasing distances from the related bearing surfaces on the shaft. Thus, the radial bearing surface 5 has inclined guiding edges 7, 7' and the axial bearing surfaces 6, 6, have inclined guiding edges 8, 8'.

The collar 9 has its free lower part submerged in an oil bath 10 in the same way as a fixed lubricating ring in a bearing with ring lubrication. Oil is raised by the collar 9 to all bearing surfaces 5, 6, 6' of the bearing bush 4, and, at the guiding edges 7, 7', 8, 8', wedge shaped oil films are produced, which create hydrodynamic oil pressure between all sliding surfaces of the bearing bush 4 and collar 9 of the shaft. Due to the guiding edges 7, 7', 8, 8' being arranged at both sides, this effect is achieved for either direction of rotation of the shaft 1.

The bearing surfaces of the bush 4 are arranged around the profile of the collar 9 (Fig. 1) in such a manner, that the radial load bearing surface 2 is provided on the largest circumferential radius, whereas the axial load bearing surfaces 6, 6' form the side walls of the respective profile. This results in an increase in the resistance to the loss of oil at the sides of the radial load bearing surface 5, because the oil has to flow through a narrow gap—that is, through the play between the axial load bearing surfaces 6, 3, or 6', 3'—in which the escape of oil is resisted, on the one hand, by the hydrodynamic pressure between the axial load bearing surfaces and, on the other hand, by the centrifugal force acting on the escaping oil.

Such restriction of the marginal losses of lubrication oil from the radial load bearing surface 5 makes it possible to achieve a substantial increase in the radial carrying capacity, while the resistance or hydrodynamic pressure between the axial load bearing surfaces is preferably utilised for receiving the axial loading force $P_{A_1}$ or $P_{A_2}$, or for avoiding axial play of the journalled shaft 1.

It is apparent that the above described arrangement of the bearing will be of particular advantage for example for mounting shafts subject to a vertical load, for example, for vehicles, railway car axles and the like.

Figure 3:
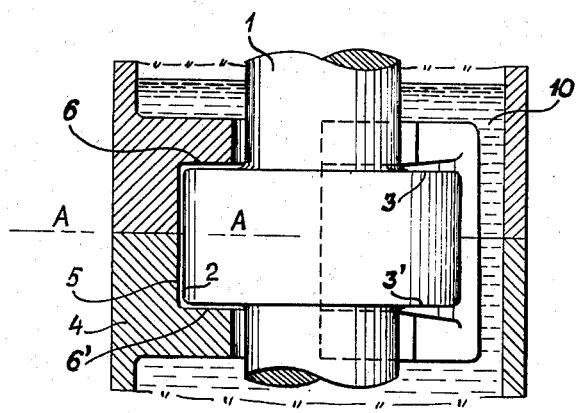
Fig. 3 is a cross sectional view of a vertical bearing.
Figure 4:
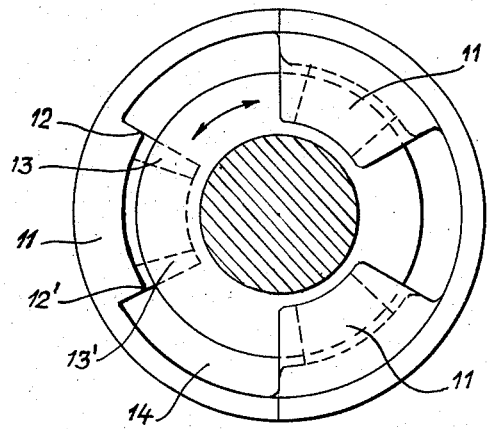
Fig. 4 is an elevational view of the bearing of Fig. 3, and shown partly in section along the line A—A.

A bearing for a vertical shaft is shown in Figs. 3 and 4. For the sake of clarity and comparison with the embodiment of Figs. 1 and 2 the parts of the bearing of Figs. 3 and 4 are identified by the same reference numerals as have been used in connection with the corresponding parts of the bearing in Figs. 1 and 2.

The vertical shaft 1 is also provided with a collar 9 having a circumferential radial load bearing surface 2 and radially directed axial load bearing surfaces 3, 3'. The bearing bush 4 consisting of two or more parts adapted to be suitably assembled has in general the shape of a hollow cylindrical body, the inner surface of which forms the bearing surfaces for the collar 9 of the shaft 1. The axial load bearing surfaces 6, 6' of the bearing bush 4 are arranged at the opposite sides of the collar 9 and each consist of fixed segments 11, for example, of three segments at each side, as shown in Fig. 4.

The axial load bearing surfaces 6, 6' on these segments have suitably slanted guiding edges 13, 13' at the opposite ends thereof.

The radial load bearing surface 5 is formed by the inner circumferential wall of the bush 4 and is divided into the same number of parts as there are segments 11 at each side of the collar 9. The segments 11 cover the individual parts of the radial load bearing surface 5, and are separated from each other by recesses 14 in the wall of the bush 4. The various parts of the radial load bearing surface 5 are also provided, at their opposite ends, with suitably inclined guiding edges 12, 12'.

The collar 9 is either fully or partly submerged in the oil bath 10. The effect in this case is similar to that in the first described embodiment of the invention, irrespective of the direction of rotation of the shaft 1.

From the foregoing it is apparent that the arrangement of Figs. 3 and 4 is suitable, for example, for the mounting of vertical shafts, of water turbines and the like. The described plain bearing for a vertical shaft may be substantially simplified if the respective loads act on the shaft in a certain direction or approximately in one plane only, so that it is then sufficient to provide, for example, only two segments at each side or only at the lower side of the shaft collar.

The plain bearing with hydrodynamic lubrication based on the disclosed principle according to the invention may, of course, be designed for adaptation to various conditions of operation, so that the possibilities of its application are very extensive. The simple and cheap design of the bearings embodying the invention allows a practically maximum utilisation of the bearing surfaces and bearing materials under most exacting conditions of operation, for example, as encountered by the bearings for the axles of railway cars, complete reliability in operation and ensures a long lifetime of the bearing.

I claim:

1. A bearing with hydrodynamic lubrication for a rotating shaft having combined radial and axial loading; said bearing comprising an enlarged diameter collar on said shaft with a cylindrical peripheral surface forming a radial load bearing surface and smooth annular end surfaces lying in radial planes and forming axial load bearing surfaces merging directly with said radial load bearing surface at the edges of the latter, and at least one segmental shell extending around a part of the circumference of said collar which lies substantially in the direction of the radial loading of said shaft to take up the loading in that direction perpendicular to the axis of the shaft, each shell having one radial load bearing surface and two axial load bearing surfaces extending radially inward at the opposite sides of said radial load bearing surface of the shell said radial load bearing surface of the shell having a uniform radius over a portion of its length which is slightly larger than the radius of said radial load bearing surface of the collar to provide a clearance between said radial load bearing surfaces for accommodating a lubricating oil film extending over the smooth surface of the enlarged diameter collar of the shaft substantially in the direction of the radial loading of the shaft, the end portions of said radial load bearing surface of the shell being spaced gradually increasing distances from said radial load bearing surface of said collar so that, when the latter is rotated in either direction, oil is drawn into said radial clearance to create a hydrodynamic pressure in the continuous oil film therein, and the two axial load bearing surfaces of the shell being spaced apart by a distance slightly larger than the axial distance between the axial load bearing surfaces of said collar to form clearances between said axial load bearing surfaces which communicate directly with the radial clearance so as to create a single continuous lubricating oil film around said part of the circumference of said collar, the end portions of the axial load bearing surfaces of the shell being spaced gradually increasing distances from the respective axial load bearing surfaces of said collar so that, when said collar is immersed in oil and rotated in either direction, oil is also drawn into said axial clearances to create a hydrodynamic pressure in the oil films on both axial load bearing surfaces tending to intensify the hydrodynamic pressure of the oil film in said radial clearance.

2. A bearing as in claim 1; wherein said shaft is disposed with its axis extending vertically, and at least three segmental shells are arranged symmetrically about said collar on the shaft, said shells forming integral, circumferentially spaced apart sections of a cylindrical body enveloping said collar of the shaft, and said body having radially inwardly opening recesses between said shells.

References Cited in the file of this patent

UNITED STATES PATENTS

| 213,310 | Yeo | Mar. 18, 1879 |
| 555,109 | McGarry | Feb. 25, 1896 |
| 563,134 | Campbell | June 30, 1896 |
| 2,014,160 | Bary | Sept. 10, 1935 |
| 2,041,390 | Bary | May 19, 1936 |

FOREIGN PATENTS

| 124,780 | Sweden | Apr. 26, 1949 |
| 1,005,435 | France | Dec. 19, 1951 |
| 702,033 | Great Britain | Jan. 6, 1954 |